(12) United States Patent
Togawa (10) Patent No.: US 8,798,326 B2
(45) Date of Patent: Aug. 5, 2014

(54) PHOTOGRAPHED IMAGE STORAGE CONTROL UNIT, PHOTOGRAPHED IMAGE STORAGE CONTROL METHOD, PHOTOGRAPHED IMAGE STORAGE CONTROL PROGRAM, AND STORAGE MEDIUM STORED WITH THE PHOTOGRAPHED IMAGE STORAGE CONTROL PROGRAM

(75) Inventor: Keiji Togawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 241 days.

(21) Appl. No.: 13/124,890

(22) PCT Filed: Sep. 10, 2009

(86) PCT No.: PCT/JP2009/065849
§ 371 (c)(1),
(2), (4) Date: Jul. 6, 2011

(87) PCT Pub. No.: WO2010/047192
PCT Pub. Date: Apr. 29, 2010

(65) Prior Publication Data
US 2011/0255803 A1     Oct. 20, 2011

(30) Foreign Application Priority Data
Oct. 20, 2008   (JP) ................. 2008-270162

(51) Int. Cl.
*G06K 9/00*     (2006.01)
*H04N 5/77*     (2006.01)
*G03B 3/00*     (2006.01)

(52) U.S. Cl.
USPC ............... 382/107; 386/226; 396/96

(58) Field of Classification Search
CPC ... H04N 1/212; H04N 1/2129; H04N 1/2133; H04N 5/262; H04N 5/2627
See application file for complete search history.

(56) References Cited

U.S. PATENT DOCUMENTS 5,029,997 A * 7/1991 Faroudja .................. 352/54
5,835,138 A * 11/1998 Kondo .................... 348/207.99

(Continued)

FOREIGN PATENT DOCUMENTS

| JP | 02196566 | 8/1990 |
| JP | 2001094923 | 4/2001 |

(Continued)

OTHER PUBLICATIONS

International Search Report dated Dec. 22, 2009 from the corresponding PCT/JP2009/065849.

(Continued)

*Primary Examiner* — Stephen R Koziol
*Assistant Examiner* — Sean Conner
(74) *Attorney, Agent, or Firm* — Katten Muchin Rosenman LLP (57) ABSTRACT

A movement quantity calculation unit 102 calculates an image movement quantity between a new frame and a previous frame, each including image data in frame units comprising a dynamic image photographed one after another by a camera 1, based on difference in image data between the frames. A storage control unit 104 stores in a time-lapse photographed image storage area 107 either the image data of the new frame or that of the previous frame as a time-lapse photographed image in the case where the image movement quantity calculated by the movement quantity calculation unit 102 has changed from being equal to or greater than a predetermined value to being less than the predetermined value.

10 Claims, 7 Drawing Sheets

(56) References Cited

U.S. PATENT DOCUMENTS

| | | | |
|---|---|---|---|
| 5,886,742 A * | 3/1999 | Hibi et al. | 375/240.16 |
| 6,078,726 A * | 6/2000 | Gotoh et al. | 386/239 |
| 6,278,466 B1 * | 8/2001 | Chen | 345/473 |
| 6,317,152 B1 * | 11/2001 | Hobson et al. | 348/150 |
| 6,480,615 B1 * | 11/2002 | Sun et al. | 382/103 |
| 6,683,677 B2 * | 1/2004 | Chon et al. | 356/28 |
| 2002/0006222 A1 * | 1/2002 | Inagaki et al. | 382/181 |
| 2002/0118286 A1 * | 8/2002 | Kanade et al. | 348/222.1 |
| 2005/0046811 A1 * | 3/2005 | Mori et al. | 353/122 |
| 2006/0197845 A1 * | 9/2006 | Masaki | 348/224.1 |
| 2006/0204236 A1 * | 9/2006 | Sasaki et al. | 396/265 |
| 2007/0030363 A1 * | 2/2007 | Cheatle et al. | 348/239 |
| 2007/0140662 A1 * | 6/2007 | Nunomaki | 386/107 |
| 2008/0056619 A1 * | 3/2008 | Ujisato et al. | 382/305 |
| 2009/0079844 A1 * | 3/2009 | Suzuki | 348/222.1 |
| 2009/0257680 A1 * | 10/2009 | Dhand et al. | 382/284 |
| 2009/0273684 A1 * | 11/2009 | Sambonsugi | 348/220.1 |
| 2010/0225786 A1 * | 9/2010 | Oisel et al. | 348/239 |
| 2012/0314951 A1 * | 12/2012 | Okabe | 382/173 |

FOREIGN PATENT DOCUMENTS

| | | | |
|---|---|---|---|
| JP | 2001298693 | | 10/2001 |
| JP | 2004-120624 | * | 4/2004 |
| JP | 2004120624 | | 4/2004 |
| JP | 2006237961 | | 9/2006 |

OTHER PUBLICATIONS

Notification of Reason(s) for Refusal dated Jun. 14, 2013, from corresponding Japanese Application No. 2008-270162.

* cited by examiner

PHOTOGRAPHED IMAGE STORAGE CONTROL UNIT, PHOTOGRAPHED IMAGE STORAGE CONTROL METHOD, PHOTOGRAPHED IMAGE STORAGE CONTROL PROGRAM, AND STORAGE MEDIUM STORED WITH THE PHOTOGRAPHED IMAGE STORAGE CONTROL PROGRAM

TECHNICAL FIELD

The present invention relates to a photographed image storage control unit, a photographed image storage control method, a photographed image storage control program, and a storage medium stored with the photographed image storage control program.

BACKGROUND ART

JP 2001-298693 A discloses a digital camera having an interval photography mode and an animation photography mode. In the interval photography mode, a static image is photographed in predetermined intervals (cycles), and in the animation photography mode, a static image is photographed through a shutter operation carried out by a user.

PRIOR ART

Patent Document

Patent Document 1: JP 2001-298693 A

SUMMARY OF THE INVENTION

Problems to be Solved by the Invention

For time-lapse photography for producing, for example, clay animation or flip animation etc., a user alternately repeats creating a desired scene in an imaging region and picturizing the created scene as a still picture. Note that the clay animation is a dynamic image created by photographing one frame of a still image after another while changing the form of a molded object made of a material such as clay. The user creates each scene by changing the form of the molded object.

However, in the above-described animation photography mode, a shutter operation should be carried out after every scene creation. Moreover, in the above-described interval photography mode, the shutter operation after every scene creation is unnecessary. However, changing of the scene must be completed within a predetermined interval. That is, the user's operations are complicated even in either of the animation photography mode or the interval photography mode.

The present invention is made in view of the above-described actual conditions, and it aims to provide an imaging device capable of time-lapse photography without requiring complicated operations.

Means to Solve the Problems

An imaging device according to the present invention includes a movement quantity calculation means and a storage control means.

The movement quantity calculation means calculates an image movement quantity between a new frame and a previous frame, each including image data in frame units comprising a dynamic image photographed by a photographing means, based on difference in image data between the frames. The storage control means stores in a storage means either the image data of the new frame or image data of the previous frame as a time-lapse photographed image in the case where the image movement quantity calculated by the movement quantity calculation means has changed from being equal to or greater than a predetermined value to being less than the predetermined value.

Result of Invention

According to the present invention, time-lapse photography can be carried out without requiring complicated operations.

BEST MODE FOR CARRYING OUT THE INVENTION

Embodiments according to the present invention are described below with reference to the drawings. These embodiments are merely examples of the present invention. They do not limit the claimed scope of the present invention and can be modified arbitrarily within the scope of the present invention.

First Embodiment

Figure 1:
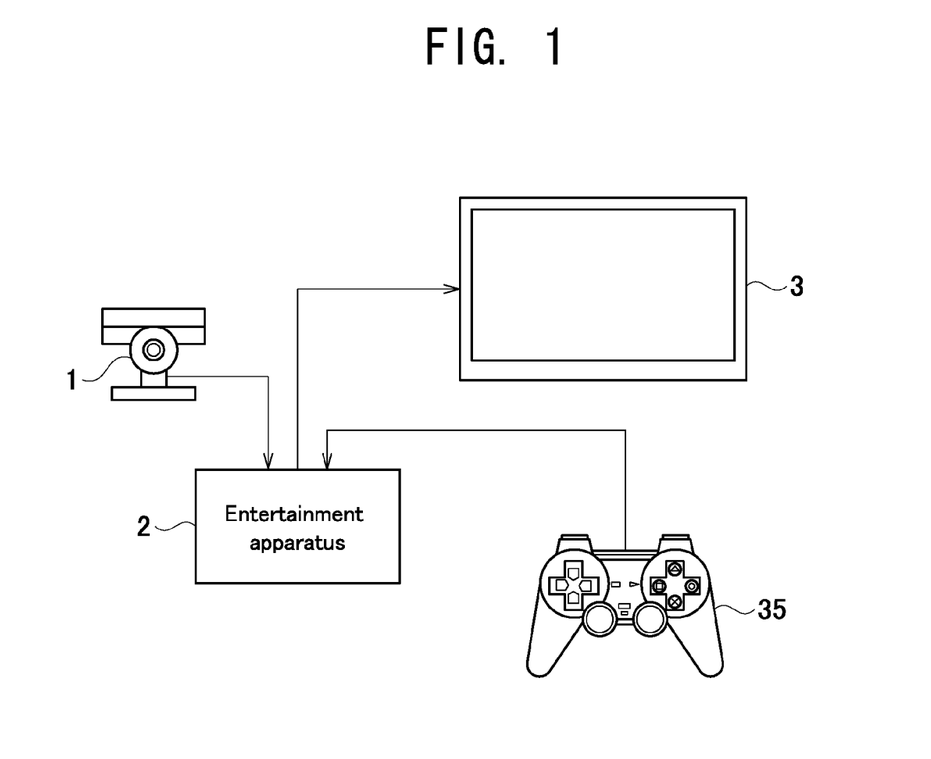
FIG. 1 is a block diagram showing the entire configuration of an imaging system according to a first embodiment.
Figure 2:
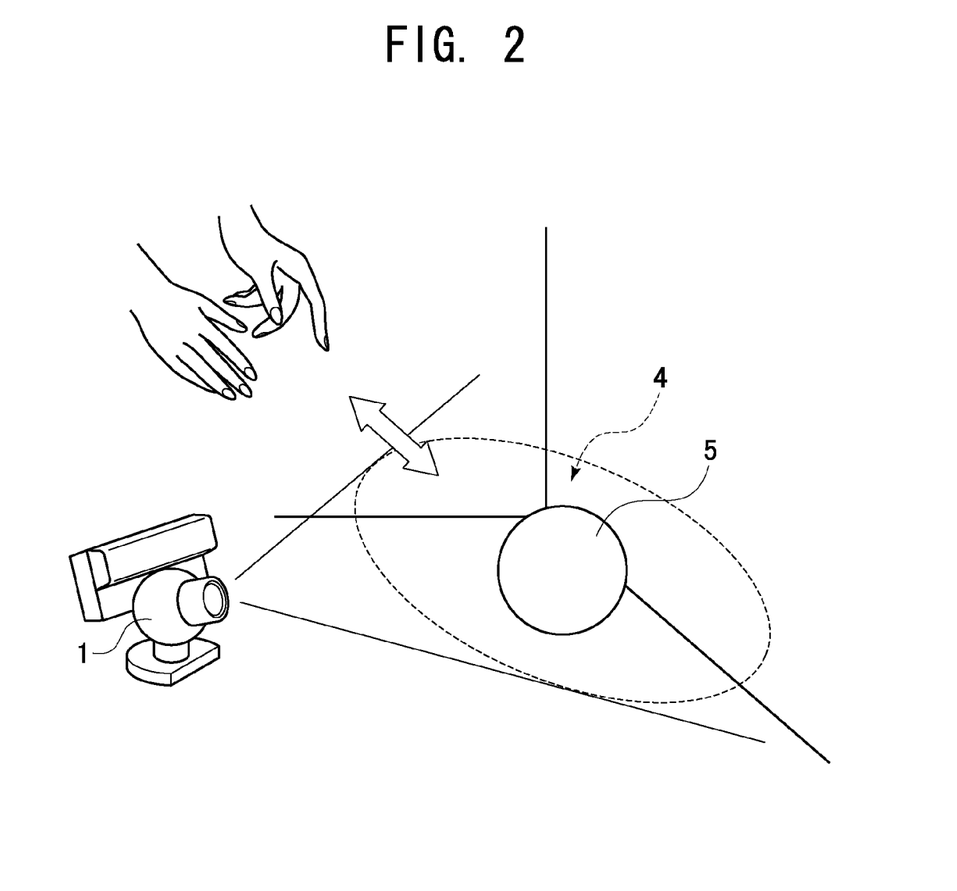
FIG. 2 is an illustration showing a camera, a scene region, and a photographic subject.

An imaging system according to a first embodiment includes a camera 1 and an entertainment apparatus 2, which functions as a photographed image storage apparatus, as shown in FIGS. 1 and 2. The camera 1 photographs a predetermined inner area in an angular field of view (scene region) 4 so as to generate image data (still image data) in frame units made up by dynamic images one after another, and sends the generated image data to the entertainment apparatus 2 one after another. The entertainment apparatus 2 displays on a display 3 images corresponding to respective pieces of the image data received from the camera 1 in real time at a predetermined frame rate (FPS: Frame Per Second). The user can recognize a photographic subject 5 in a scene region 4 taken by the camera 1 by viewing the image displayed on the display 3.

The entertainment apparatus 2 is set to a time-lapse photography mode according to a setting input to a controller 35 by the user. The entertainment apparatus 2 set in the time-lapse photography mode compares image data of the latest received frame (hereafter referred to as a new frame) of the image data transmitted one after another from the camera 1 to that of the just previously received frame (hereafter referred to as previous frame), and calculates an image movement quantity when changing from the previous frame to the new frame one after another based on the difference in image data between those frames. When the calculated movement quantity changes from being equal to or greater than a predetermined value to being less than the same, the entertainment apparatus 2 determines that the user has completed a scene creation (operation for modifying the form of the photographic subject 5 etc.), and stores the image data of the new frame one after another as a time-lapse photographed image (still image data of each scene).

[Hardware Configuration of the Entertainment Apparatus]

Figure 3:
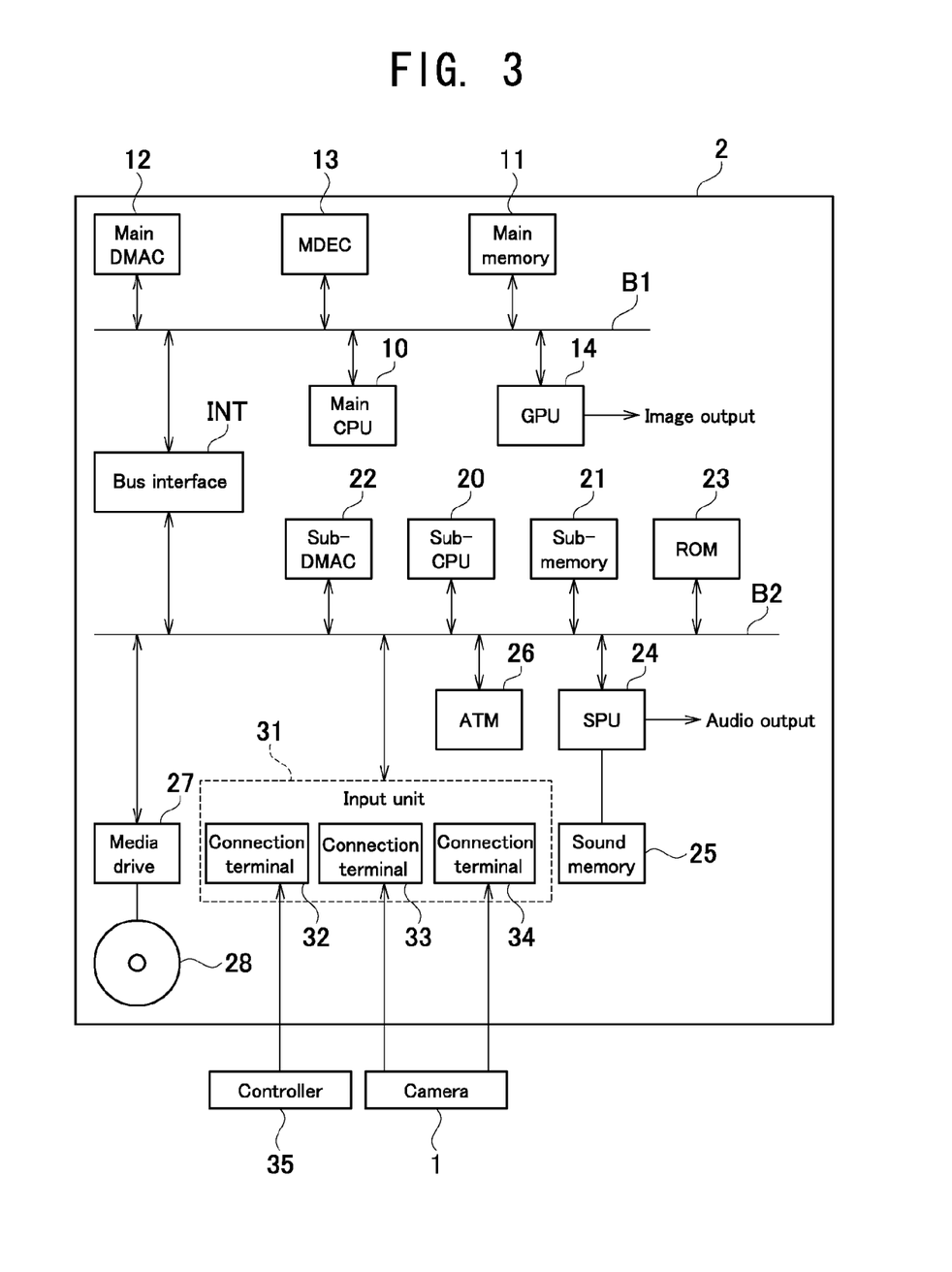
FIG. 3 is a block diagram showing a configuration of an entertainment apparatus.

The entertainment apparatus 2 is implemented by a computer, which executes a specific function according to a computer software program. The computer includes two buses: a main bus B1 and a sub-bus B2 to which multiple semiconductor devices having respective specific functions are connected, as shown in FIG. 3, for example, illustrating a hardware configuration thereof. A bus interface INT can connect and disconnect between the two buses B1 and B2.

A main semiconductor device or CPU 10, main memory 11 made up from RAM, a main Direct Memory Access Controller (DMAC) 12, a Moving Picture Experts Group (MPEG) decoder (MDEC) 13, and a graphic processing unit (GPU) 14 are connected to the main bus B1. The GPU 14 performs display control of the display 3 by outputting data written in frame memory (not illustrated in the drawings) to the display 3.

Upon startup of the computer, the main CPU 10 reads a boot program out from ROM 23 on the sub-bus B2 via the bus interface INT and then executes the boot program so as for an operating system to start its own operation. Moreover, it controls a media drive 27, reads an application program or data out from a media 28 loaded in the media drive 27, and stores it in the main memory 11. Furthermore, it carries out geometry processing (coordinate value calculation) for expressing the form and movement of an object corresponding to three-dimensional object data (coordinate values of the polygon vertices (representative points) etc.) made up by the various data read out from the media 28, for example, multiple basic polygons, and generates a display list including polygon defining information (specification of the form of a polygon to be used and its drawing position, and kind, color tone, texture etc. of the material of the polygon) provided through the geometry processing.

The GPU 14 is a semiconductor device, which holds drawing contexts (drawing data containing polygon material), reads a necessary drawing context out in accordance with the display list notified by the main CPU 10, carries out rendering processing (drawing processing), and draws a polygon in the frame memory.

The main DMAC 12 is a semiconductor device, which performs DMA transfer control for each circuit connected to the main bus B1 and each circuit connected to the sub-bus B2 in accordance with the state of the bus interface INT. The MDEC 13 is a semiconductor device, which operates in parallel with the main CPU 10 and decompresses compressed data, which is compressed by a Moving Picture Experts Group (MPEG) method or a Joint Photographic Experts Group (JPEG) method.

A sub-CPU 20 made up of a microprocessor etc., sub-memory 21 made up of RAM, a sub-DMAC 22, ROM 23 stored with a control program, such as an operating system, a sound processing semiconductor device (SPU: Sound Processing Unit) 24, which reads out audio data from sound memory 25 and outputs it as audio output, a communication control unit (ATM) 26, which transmits and receives information to/from an external device through a network not shown in the drawing, the media drive 27 in which the media 28 such as a CD-ROM or a DVD-ROM is loaded, and an input unit 31 are connected to the sub-bus B2.

The sub-CPU 20 performs various operations according to the control program stored in the ROM 23. The sub-DMAC 22 is a semiconductor device, which controls DMA transmission etc. for each circuit connected to the sub-bus B2 only in the state where the sub-bus B2 is separated from the main bus B1 by the bus interface INT.

The input unit 31 includes a connection terminal 32, which receives an incoming signal from a controller 35, a connection terminal 33, which receives an image signal from the camera 1, and a connection terminal 34, which receives a sound signal from the camera 1. The main CPU 10 controls the GPU 14 and the SPU 24 in conformity with a user's instruction received from the controller 35 through the connection terminal 32, so as to control display of images and generation of sound.

A time-lapse photographed image storage area 107 (shown in FIG. 4) and an ON/OFF setting area (not illustrated in the drawings) are prepared beforehand in the main memory 11.

The computer constituted with such a configuration operates as the entertainment apparatus 2 by the main CPU 10, the sub-CPU 20, and the GPU 14 reading out a necessary computer program from the ROM 23 or a recording medium such as the media 28 and executing it.

The entertainment apparatus 2 is set to a mode corresponding to a predetermined instruction input by the user via the controller 35, of multiple modes including the time-lapse photography mode. The entertainment apparatus 2 set to the time-lapse photography mode displays a camera image and stores a time-lapse photographed image. Note that the displaying of the camera image may be carried out in a mode other than the time-lapse photography mode.

[Functional Configuration of Entertainment Apparatus]

Figure 4:
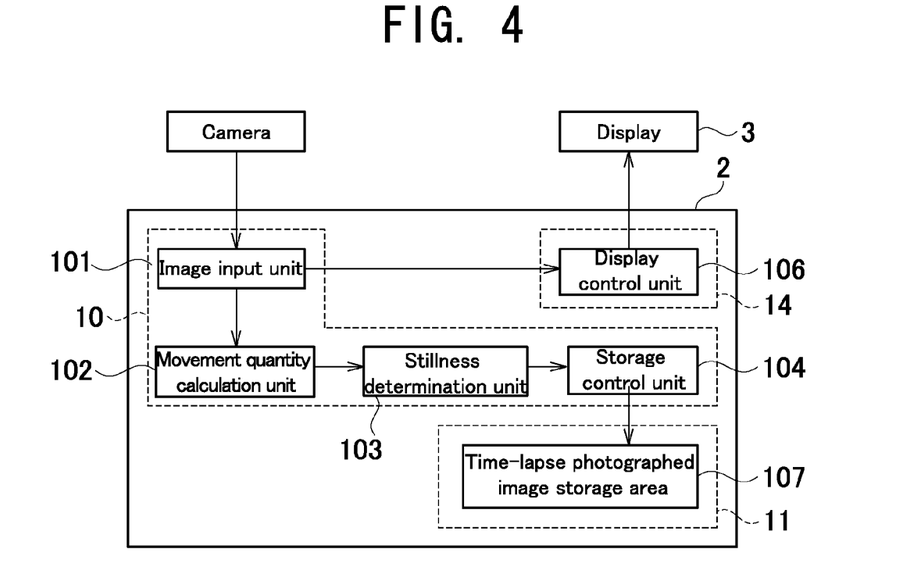
FIG. 4 is a block diagram showing a functional configuration of the entertainment apparatus.

In the time-lapse photography mode, the main CPU 10 of the entertainment apparatus 2 functions as an image input unit 101, a movement quantity calculation unit 102, a stillness determination unit 103, and a storage control unit 104 while the GPU 14 functions as a display control unit 106, as shown in FIG. 4.

The image input unit 101 receives image data transmitted from the camera 1 continuously, and stores them one after another in a predetermined storage area (e.g., image data tentative storage area in the main memory 11). Note that the image input unit 101 may delete pieces of image data of an unnecessary frame from the storage area one by one after the camera image has been displayed and the time-lapse photographed image has been stored, which will be described later.

The display control unit 106 carries out displaying of a camera image. The display control unit 106 makes the display 3 display an image corresponding to image data received by the image input unit 101 in real time at a predetermined frame rate. Moreover, the display control unit 106 makes the display 3 display the stored time-lapse photographed image for a predetermined period of time, when a time-lapse photographed image is stored, which will be described later.

The movement quantity calculation unit 102, the stillness determination unit 103, and the storage control unit 104 perform time-lapse photographed image storage processing. The movement quantity calculation unit 102 compares the image data of the new frame to that of the previous frame among the pieces of image data that the image input unit 101 has received from the camera 1, and calculates an image movement quantity between those frames. The stillness determination unit 103 determines whether the movement quantity calculated by the movement quantity calculation unit 102 has changed from being equal to or greater than a predetermined threshold to being less than the same. Since there is a high possibility that the user has completed creation of a scene when the image movement quantity between the frames has changed from being equal to or greater than the predetermined threshold to being less than the same during time-lapse photography, the storage control unit 104 stores the pieces of image data of the new frame one after another in the time-lapse photographed image storage area 107 of the main memory 11. Note that the time-lapse photographed image storage area 107 may be established in the sub-memory 21 or the media 28, for example. Moreover, instead of the image data of the new frame, image data of the previous frame may be stored as a time-lapse photographed image.

[Calculation of Image Movement Quantity]

The movement quantity calculation unit 102 calculates an image movement quantity between the new frame and the previous frame based on pixel differences between the frames and an optical flow thereof.

In the case of using the pixel differences, the movement quantity calculation unit 102 compares each pixel to corresponding pixel (pixel to corresponding pixel in the same position) between the frames, for example, calculates a pixel difference (e.g., difference in brightness) between each pixel and corresponding pixel, and calculates the sum of the calculated pixel differences as an image movement quantity. The movement quantity calculation unit 102 may calculate each pixel difference of the entire image, or may calculate each pixel difference in a predetermined range of the entire image.

In the case of using the optical flow, the movement quantity calculation unit 102 divides those respective frames into a predetermined number of areas (elements), determines to which element in the new frame each element in the previous frame has moved, calculates a displacement (vector) between each element and corresponding element, and calculates the sum of the magnitudes of respective vectors (scalars) between the respective elements as an image movement quantity. Note that the movement quantity calculation unit 102 may calculate the vector between each element of the entire image, or may calculate the vector between each element in a predetermined range of the entire image.

[Storing of Time-Lapse Photographed Image]

Figure 5:
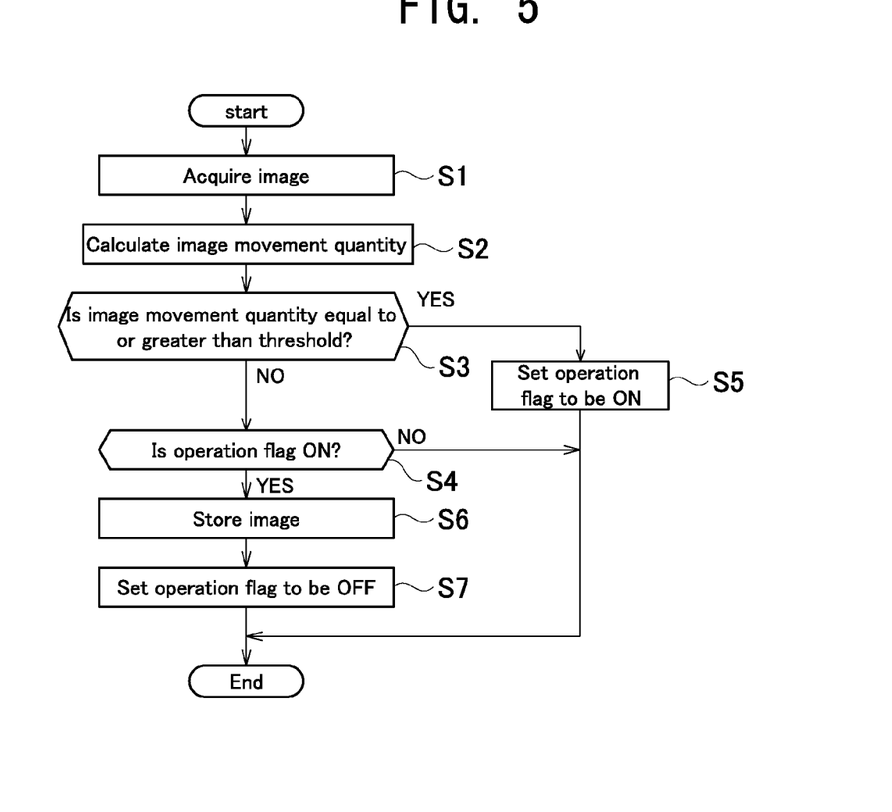
FIG. 5 is a flow chart for time-lapse photographed image storage processing.
Figure 6:
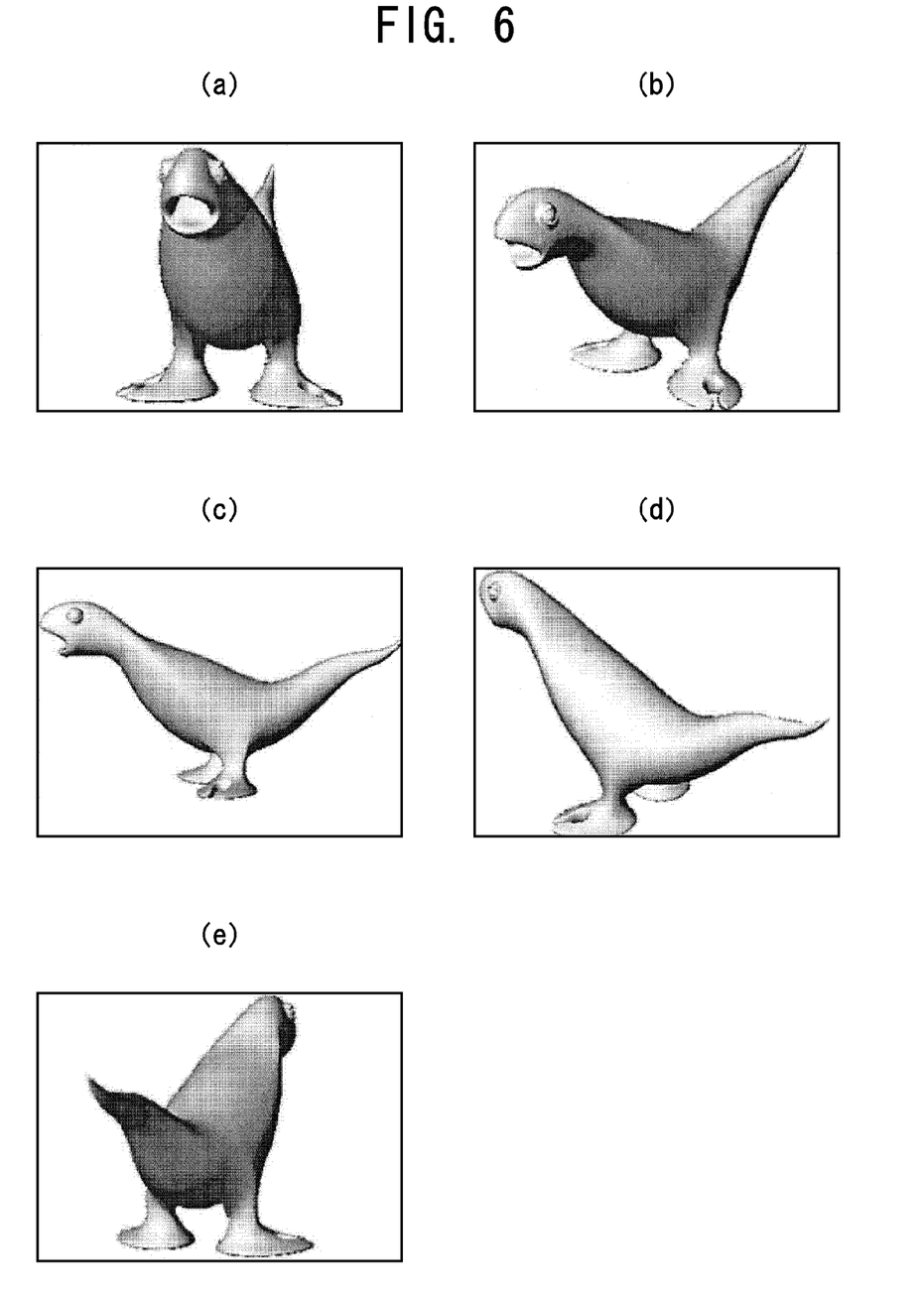
FIG. 6 shows examples of a time-lapse photographed image.

Storing of a time-lapse photographed image by the main CPU 10 in the case where a user sets the entertainment apparatus 2 to the time-lapse photography mode and creates a clay animation or a flip animation is described based on a flow chart of FIG. 5. Note that storing of the time-lapse photographed image is triggered once the entertainment apparatus 2 has entered the time-lapse photography mode, and it is repeatedly carried out at predetermined intervals while in the time-lapse photography mode. Moreover, an operation flag described later is set to be OFF at the time of entering the time-lapse photography mode.

Once storing a time-lapse photographed image is started, the image data of the new frame and that of the previous frame are acquired (step S1), and an image movement quantity between those frames is calculated (step S2).

Next, it is determined whether the image movement quantity calculated in step S2 is equal to or greater than a predetermined threshold (step S3), and if the image movement quantity is determined to be less than the predetermined threshold (No in step S3), whether the operation flag is ON (step S4) is then determined.

If the operation flag is ON (Yes in step S4), the image data of the new frame is stored as a time-lapse photographed image in the image storage area 107 (step S6), the operation flag is set to be OFF (step S7), and this processing ends.

On the other hand, if the image movement quantity is equal to or greater than the predetermined threshold (Yes in step S3), the operation flag is set to be ON (step S5), and this processing then ends.

Moreover, if the image movement quantity is less than the predetermined threshold (No in step S3) and the operation flag is OFF (No in step S4), this processing then ends.

When the user has not yet started creation of a new scene, such as a period immediately after having entered the time-lapse photography mode, or a period after one scene has been created until creation of the following scene is started, the image movement quantity is kept to be less than the predetermined threshold. Therefore, since the image movement quantity is less than the predetermined threshold (No in step S3) and the operation flag is OFF (No in step S4), the time-lapse photographed image is not stored (i.e., processing of step S6 is not carried out.)

When the user puts his/her hand in the scene area 4 and modifies the photographic subject 5 (form, position etc. thereof) so as to create a scene, the moving user's hand will also be photographed by the camera 4. Therefore, the image movement quantity is equal to or greater than the predetermined threshold (Yes in step S3) and the operation flag is then set to be ON (step S5). However, the time-lapse photographed image is not stored (processing of step S6 is not carried out.)

Once the scene creation is completed and the user has withdrawn his/her hand from the scene area 4, all of what is photographed by the camera 4 come to a standstill. Accordingly, since the image movement quantity becomes less than the threshold (No in step S3), and the operation flag is ON (Yes in step S4), the time-lapse photographed image of the new frame is then stored (step S6).

In such a manner, according to the time-lapse photography mode of this embodiment, the user who creates a clay animation or a flip animation can store one by one the time-lapse photographed images of respective desired scenes of FIGS. 6(a) to 6(e), for example, without inputting an instruction for storing the time-lapse photographed image separately, but only by repeating the steps of: setting the photographic subject 5 in the scene area 4, moving a hand in the scene area 4 so as to set the photographic subject 5 to be in a desired state, thereby creating a desired scene, and then withdrawing the hand from the scene area 4.

Another embodiment according to the present invention will be described below. Note that in the following embodiments, descriptions of the same structures as those in the first embodiment described above are omitted.

Second Embodiment

Figure 7:
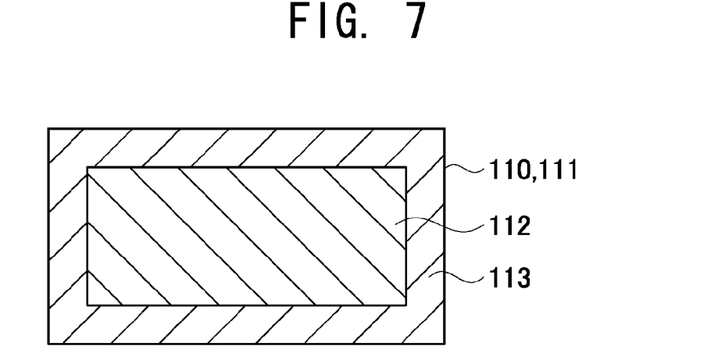
FIG. 7 is an illustration showing the central region of a frame and its peripheral region according to a second embodiment.

In a second embodiment according to the present invention, as shown in FIG. 7, by dividing a previous frame 110 and a new frame 111 respectively into a central region 112 and a peripheral region 113, calculating the image movement quantity in the central region 112 between those frames 110 and 111 (movement quantity of the central image) and that in the peripheral region 113 between the same using pixel differences or an optical flow, and weighting on the movement quantity of the peripheral image and adding it to the movement quantity of the central region, the movement quantity calculation unit 102 calculates the image movement quantity (movement quantity of the entire image region) between those frames 111 and 112.

For example, when using pixel differences, as to the central region 112, each pixel and corresponding pixel in the central regions 112 (pixel to corresponding pixel in the same position) of the respective frames 110 and 111 are compared, the pixel difference between each pixel and corresponding pixel is calculated, and the sum of the calculated pixel differences is calculated as the image movement quantity of the central region 112. Similarly, as to the peripheral region 113, each pixel and corresponding pixel in the peripheral region 113 (pixel to corresponding pixel in the same position) of the respective frames 110 and 111 are compared, and the pixel difference between each pixel and corresponding pixel is calculated, and the sum of the calculated pixel differences is calculated as the image movement quantity of peripheral region 113. The image movement quantity between those frames 111 and 112 is obtained by adding a value resulting from weighting on the sum of the pixel differences for the peripheral region 113 (i.e., value obtained by multiplying the sum of the pixel differences for the peripheral region 113 by a certain coefficient exceeding 1.0) to the sum of the pixel differences for the central region 112.

Generally, when the user's hand makes contact with the photographic subject 5 in the scene area 4, the hand must be photographed in a wide range covering the central region 112 and the peripheral region 113 in the frames 110 and 111. Therefore, even if the image movement quantity between the frames 110 and 111 is calculated by equally evaluating the movement quantity of the central image and that of peripheral image, and simply adding the resulting evaluated values together, the calculated image movement quantity tends to be a comparatively high value while the user is changing the state of the photographic subject 5, and thus there is little possibility that it is equal to or less than the predetermined valued.

On the other hand, when creation of the scene is completed and the user is withdrawing his/her hand from the scene area 4, the hand will be photographed in the comparatively narrow range of merely the peripheral region 113. Therefore, if the image movement quantity between the frames 110 and 111 is calculated by evaluating the movement quantity of the central image and that of the peripheral image equally and simply adding the resulting evaluated values together, the calculated image movement quantity tends to be a comparatively small value and determined to be equal to or less than the predetermined value when the user is withdrawing his/her hand from the scene area 4 after completion of the scene creation, and thus the user's hand may be included and stored in the time-lapse photographed image.

In light of this problem, this embodiment does not equally evaluate the image movement quantity for the central image and that for the peripheral image, but adds a weight to the image movement quantity for the peripheral image and adds it to the image movement quantity for the central image, and then calculates the image movement quantity between the frames 111 and 112. Therefore, it is difficult for the image movement quantity between the frames 111 and 112 to be equal to or less than the predetermined value when the user is withdrawing his/her hand after completion of the scene creation, resulting in reduction in possibility that the user's hand is included and stored in the time-lapse photographed image. As a result, it can be prevented that the user's hand is accidentally included and stored in the time-lapse photographed image after completion of the scene creation.

Third Embodiment

Figure 8:
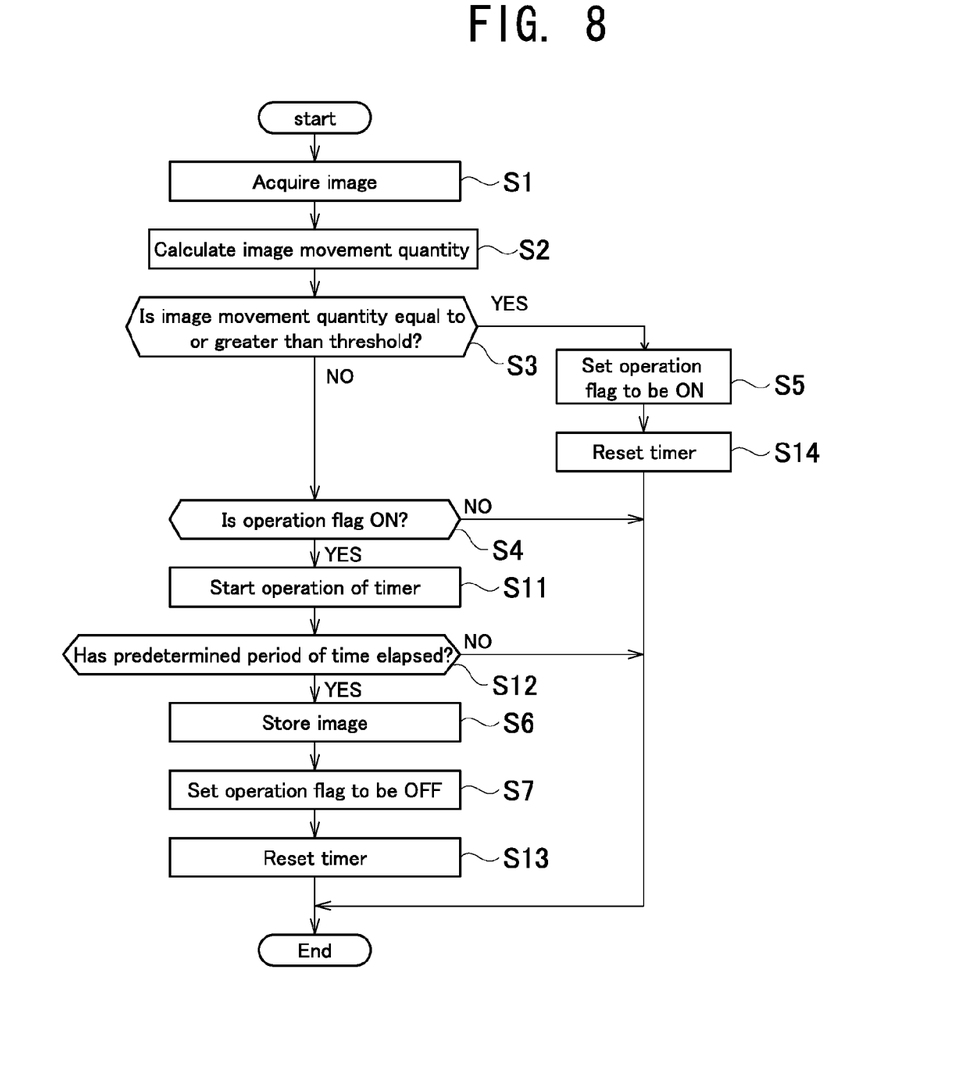
FIG. 8 is a flow chart for time-lapse photographed image storage processing according to a third embodiment.

According to a third embodiment of the present invention, after the image movement quantity has changed from being equal to or less than a predetermined value to being less than the same, and the image movement quantity is then kept to be less than the predetermined value for a predetermined fixed period of time, the storage control unit 104 stores the time-lapse photographed image in the time-lapse photographed image storage area 107. Moreover, after the image movement quantity has changed from being equal to or greater than the predetermined value to being less than the same, the display control unit 106 makes the display 3 display elapsed time information indicating either the lapsed time since change in the image movement quantity to less than the predetermined value or the remaining time calculated by subtracting the lapsed time from a predetermined time while the image movement quantity is kept to be less than the predetermined value.

For example, as shown in the flow chart of FIG. 8, storing of a time-lapse photographed image is started. Image data of the new frame and that of the previous frame are acquired (step S1). The image movement quantity between those frames is calculated (step S2), and if the calculated image movement quantity is less than a predetermined threshold (No in step S3) and the operation flag is ON (Yes in step S4), time keeping with an internal timer (not illustrated in the drawings) of the main CPU 10 starts (step S11). Note that if time keeping is already in progress with the internal timer, processing of step S11 is not carried out but proceeds to step S12.

Afterwards, it is determined whether the internal timer has reached a predetermined point of time (i.e., whether a predetermined period of time has elapsed while the image movement quantity is being kept less than the predetermined value after the image movement quantity has changed from being equal to or greater than the predetermined value to being less than the same) (step S12). If the predetermined period of time has elapsed (Yes in step S12), the image data of the previous frame or that of the new frame acquired when keeping time for the predetermined period of time has started is stored as a time-lapse photographed image in the image storage area 107 (step S6). The operation flag is set to be OFF (step S7) and the timer is reset (stopped and cleared) (step S13), thereby ending this processing. Note that elapsed time information indicating at least either the elapsed time since the start of time keeping or the remaining time resulting from subtracting the elapsed time from a predetermined time (at least either a count-up display of the elapsed time or a count-down display since the predetermined time) as well as the time-lapse photographed image which will be stored in step S6 (hereafter, referred to as a preliminary time-lapse photographed image) are displayed on the display 3 while time keeping is in progress with the internal timer. Moreover, the time-lapse photographed image stored in step S6 may be image data of any one of the frames acquired during a time ranging from when time keeping has started until the predetermined time has elapsed.

Meanwhile, if the image movement quantity is equal to or greater than the predetermined threshold (Yes in step S3), the operation flag is set to be ON (step S5), and the timer is reset (stopped and cleared) (step S14), thereby ending this processing.

Moreover, if the image movement quantity is less than the predetermined threshold (No in step S3) and the operation flag is OFF (No in step S4), or the image movement quantity is less than the predetermined threshold (No in step S3) and the operation flag is ON (Yes in step S4) and a predetermined period of time has not yet elapsed (No in step S12), this processing then ends.

If the user has not yet started creating a new scene, the image movement quantity is kept less than the predetermined threshold. Therefore, it is determined that the image movement quantity is less than the predetermined threshold (No in step S3) and that the operation flag is OFF (No in step S4). Time keeping with the internal timer is not started and the time-lapse photographed image is not stored (i.e., processing of steps S11 and S6 is not carried out.)

When a user puts his/her hand into the scene area 4 and modifies the state (form, posture etc.) of the photographic subject 5 in order to create a scene, the user's hand is included in what is photographed by the camera 4. Accordingly, the image movement quantity becomes equal to or greater than the predetermined threshold (Yes in step S3), and the operation flag is set to be ON (step S5). However, time keeping with the internal timer is not started, and the time-lapse photographed image is not stored (i.e., processing of steps S11 and S6 is not carried out.)

Once creation of the scene is completed and the user has withdrawn his/her hand from the scene area 4, all of what is photographed by the camera 4 come to a standstill. Accordingly, since the image movement quantity becomes less than the predetermined threshold (No in step S3) and the operation flag is ON (Yes, in step S4), time keeping with the internal timer is then started (step S11). If the predetermined period of time has elapsed while the image movement quantity is kept to be less than the predetermined threshold (Yes in step S12), the time-lapse photographed image will be stored (step S6).

Moreover, the user who has completed creation of the scene can examine during a predetermined period of time whether a desired scene has been created while viewing the lapsed time information and the preliminary time-lapse photographed image displayed on the display 3. If it is determined before the predetermined period of time has elapsed that the desired scene is not created, the user may put his/her hand into the scene area 4 again and change the state of the photographic subject 5 so that the image movement quantity becomes equal to or greater than the predetermined threshold (Yes in step S3). As a result, the preliminary time-lapse photographed image is not stored in the time-lapse photographed image storage area 11 but discarded. On the other hand, if it is determined that the desired scene has been created, the preliminary time-lapse photographed image is stored as is as a time-lapse photographed image after a predetermined period of time has elapsed.

As such, according to this embodiment, the user who wants to change a scene after creation of the scene is completed can discard the image data of the scene not yet modified and save only the modified scene without performing complicated operations such as a special inputting operation etc.

Fourth Embodiment

Figure 9:
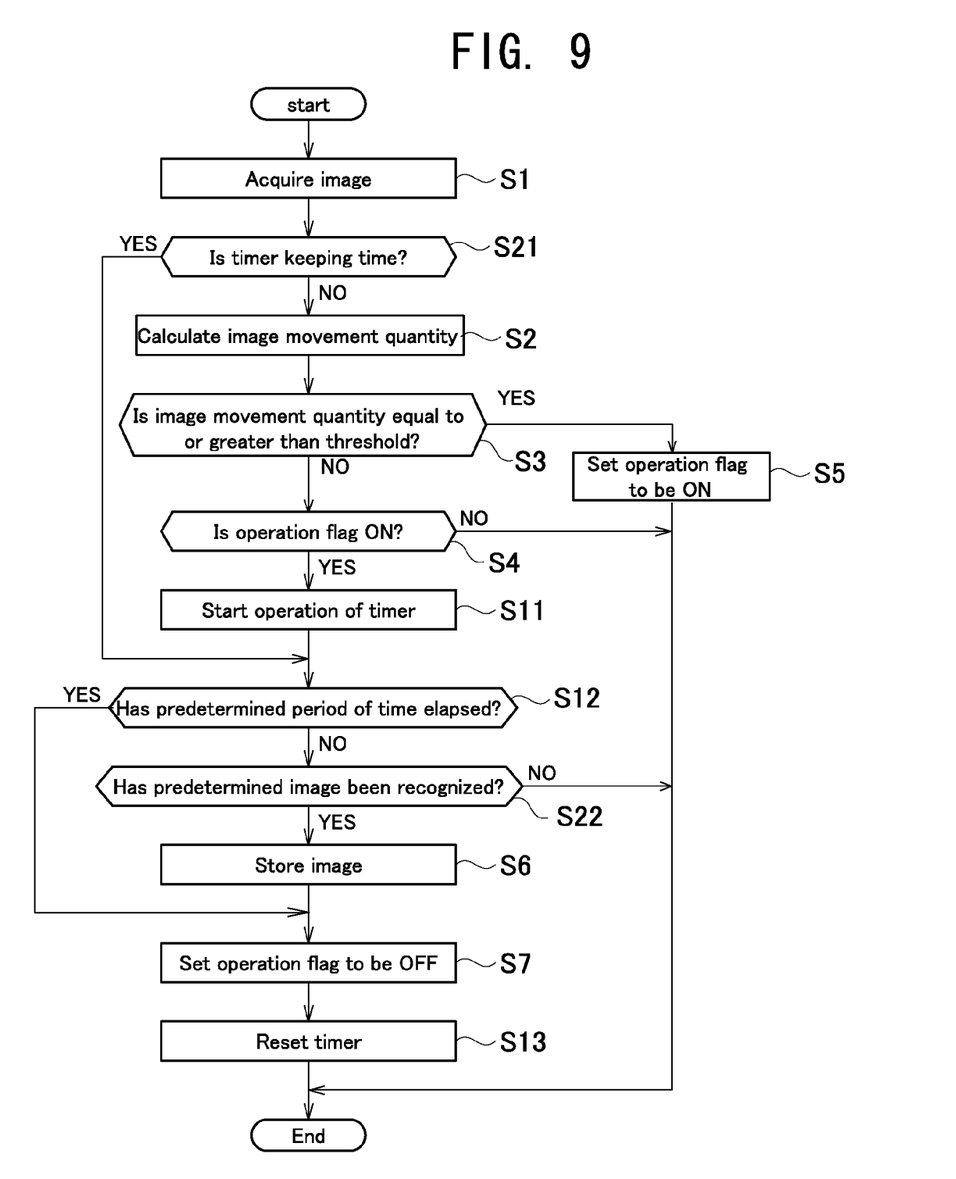
FIG. 9 is a flow chart for time-lapse photographed image storage processing according to a fourth embodiment.

The main CPU 10 according to the fourth embodiment of the present invention functions as an image recognition determination means, which analyzes the image data received from the camera 1 and determines whether the image data contains a predetermined image (i.e., a predetermined image form that a user has put in the scene area 4 intentionally, for example, an image of a ring formed by the thumb and index finger.) The storage control unit 104 stores a time-lapse photographed image in the time-lapse photographed image storage area 107 if it is determined during a predetermined period of time since the image movement quantity has changed from being equal to or greater than a predetermined value to being less than the same. Moreover, the display control unit 106, during either a time ranging from when the image movement quantity has changed from being equal to or greater than the predetermined value to being less than the same until when it is determined that the image data contains the predetermined image, or a time ranging from when the image movement quantity has changed from being equal to or greater than the predetermined value to being less than the same until a predetermined period of time has elapsed, makes the display 3 display lapse time information indicating either the lapsed time since the image movement quantity has changed to being less than the predetermined value or the remaining time resulting from subtracting the elapsed time from a predetermined time.

For example, as shown in the flow chart of FIG. 9, once storing of a time-lapse photographed image has started, and image data of the new frame and that of the previous frame are acquired (step S1), whether time keeping with the internal timer (not illustrated in the drawings) of the main CPU 10 is in progress is determined (step S21).

If time keeping is not in progress with the internal timer (No in step S21), the image movement quantity between those frames is calculated (step S2). If the calculated image movement quantity is less than a predetermined threshold (No in step S3) and the operation flag is ON (Yes in step S4), the internal timer (not illustrated in the drawings) of the main CPU 10 starts keeping time (step S11).

Afterward, it is determined whether the internal timer has reached the predetermined time (i.e., whether the predetermined period of time has elapsed while the image movement quantity is kept less than a predetermined value after the image movement quantity has changed from being equal to or greater than the predetermined value to being less than the same) (step S12). If the predetermined period of time has not yet elapsed (No in step S12), it is then determined whether a predetermined image is recognized (i.e., whether the image data of the new frame acquired in step S1 contains the predetermined image) (step S22). Since such a predetermined image cannot be recognized at the time of starting to keep time with the internal timer in general (No in step S22), this processing then ends.

If time keeping with the internal timer is in progress (Yes in step S21), this processing proceeds to step S22, in which it is determined whether the predetermined image is recognized. If the predetermined image is recognized (Yes in step S22), the image data of the previous frame or that of the new frame acquired at the time of starting to keep time is stored as a time-lapse photographed image in the image storage area 107 (step S6), the operation flag is set to be OFF (step S7), the timer is reset (stopped and cleared) (step S13), and this processing then ends. Note that elapsed time information indicating at least either the elapsed time since the start of time keeping or the remaining time resulting from subtracting the elapsed time from the predetermined time (at least either a count-up display of the elapsed time or a count-down display since the predetermined point of time) as well as a time-lapse photographed image which will be stored in step S6 (i.e., preliminary time-lapse photographed image) are displayed on the display 3 while keeping time is in progress with the internal timer.

If the internal timer has reached the predetermined time (Yes in step S12), the operation flag is set to be OFF (step S7), the timer is reset (step S13), and this processing then ends. Meanwhile, if the image movement quantity is equal to or greater than the predetermined threshold (Yes in step S3), the operation flag is set to be ON (Step S5), and this processing then ends.

Moreover, if the image movement quantity is less than the predetermined threshold (No in step S3) and the operation flag is OFF (No in step S4), this processing then ends.

If the user has not yet started creation of a new scene, the internal timer has not yet started keeping time (No in step S21), the image movement quantity is less than the predetermined threshold (No in step S3), and it is determined that the operation flag is OFF (No in step S4), the internal timer does not start keeping time, and the time-lapse photographed image is not stored (processing of steps S11 and S6 is not carried out.)

When a user puts his/her hand into the scene area 4 and modifies the state (form, posture etc.) of the photographic subject 5 in order to create a scene, the user's hand is included in what is photographed by the camera 4. Accordingly, the image movement quantity becomes equal to or greater than the predetermined threshold (Yes in step S3), and the operation flag is set to be ON (step S5). However, time keeping with the internal timer is not started, and the time-lapse photographed image is not stored (i.e., processing of steps S11 and S6 is not carried out.)

Once creation of the scene is completed and the user has withdrawn his/her hand from the scene area 4, all of what is photographed by the camera 4 come to a standstill. Accordingly, since the image movement quantity becomes less than the predetermined threshold (No in step S3) and the operation flag is ON (Yes in step S4), time keeping with the internal timer is started (step S11). At this time, since the user has withdrawn his/her hand from the scene area 4, the predetermined image cannot be recognized (No in step S22), and the time-lapse photographed image is not stored (i.e., processing of step S6 is not carried out.)

The user who has completed creation of the scene can examine during a predetermined period of time whether a desired scene has been created while viewing the lapsed time information and the preliminary time-lapse photographed image displayed on the display 3. If the user determines that the desired scene is created, he/she may put a predetermined form (e.g., a ring formed by the thumb and index finger of his/her hand) into the scene area 4 so as to recognize a predetermined image (step S21, step S12, and to step S22 in which Yes is obtained.) The time-lapse photographed image is stored as a result (step S6). On the other hand, if the user determines that the desired scene is not created, the preliminary time-lapse photographed image is not stored in the time-lapse photographed image storage area 11 but discarded after a predetermined period of time has elapsed (step S12, step S7, and to step S13).

As such, according to this embodiment, the user who wants to change a scene after creation of the scene is completed can discard the image data of the scene not yet modified and save only the modified scene without performing complicated operations such as a special inputting operation etc.

Moreover, when not changing a scene, the time-lapse photographed image can be stored by putting a predetermined form in the scene area 4, and the next scene can be created without waiting for a predetermined period of time.

Note that while in the above-described embodiment, the entertainment apparatus 2 has a function as a photographed image storage apparatus, the camera 1 may alternatively have a function as the photographed image storage apparatus.

That is, the present invention is not limited to the above-given embodiments described merely as an example. Aside from the above embodiments, various changes may be made without departing from the technical spirit or scope of the present invention

INDUSTRIAL APPLICABILITY

The present invention is widely applicable to storage control of image data generated one after another through photographing.

DESCRIPTION OF REFERENCE NUMERALS

1: camera, 2: entertainment apparatus, 3: display, 4: scene area, 5: photographic subject, 10: main CPU, 11: main memory, 14: GPU, 35: controller, 101: image input unit, 102: movement quantity calculation unit, 103: stillness determination unit, 104: storage control unit, 107: time-lapse photographed image storage area

What is claimed is:

1. A photographed image storage control apparatus comprising:
    an input means for continuously receiving a plurality of image frames in response to an input by a user which initiates a time lapse photography mode, each image frame including image data in frame units comprising a dynamic image photographed by a photographing means at a predetermined interval;
    a movement quantity calculation means for calculating an image movement quantity between a new frame and a previous frame among the plurality of received image frames based on a difference in image data between the new frame and the previous frame; and
    a storage control means for storing in a storage means either the image data of the new frame or image data of the previous frame as a first time-lapse photographed image in a time lapse set of images when the image movement quantity calculated by the movement quantity calculation means has changed from being equal to or greater than a predetermined value to being less than the predetermined value, wherein:
    the storage control means does not store in the storage means the image data as the first time-lapse photographed image if the image movement quantity remains less than the predetermined value,
    while operating in the time lapse photography mode and without requiring any further input by the user, the movement quantity calculation means calculates a subsequent image movement quantity between each pair of image frames received subsequent to the new frame by the input means, and
    the storage control means stores in the storage means image data of one image frame among the pair of image frames as a next time lapse photographed image in the time lapse series of images, whenever the subsequent image movement quantity calculated by the movement quantity calculation means changes from being equal to or greater than the predetermined value to being less than the predetermined value.

2. The photographed image storage control apparatus according to claim 1, wherein the difference in image data between the frames is a pixel difference.

3. The photographed image storage control apparatus according to claim 1, wherein the difference in image data between the frames is based on a vector calculated based on an optical flow.

4. The photographed image storage control apparatus according to claim 1, wherein the movement quantity calculation means calculates the image movement quantity between the frames by calculating a central image movement quantity between central regions of the respective frames and a peripheral image movement quantity between peripheral regions of the respective frames based on the difference in the image data, adding a weight to the peripheral image movement quantity, and adding the weighted peripheral image movement quantity to the central image movement quantity.

5. The photographed image storage control apparatus according to claim 1, wherein the storage control means stores the time-lapse photographed image in the storage means in the case where the image movement quantity has changed from being equal to or greater than a predetermined value to being less than the predetermined value and the image movement quantity has been kept less than the predetermined value for at least a predetermined time.

6. A photographed image storage control apparatus comprising:
   a movement quantity calculation means for calculating an image movement quantity between a new frame and a previous frame, each including image data in frame units comprising a dynamic image photographed by a photographing means, based on difference in image data between the frames,
   a storage control means for storing in a storage means either the image data of the new frame or image data of the previous frame as a time-lapse photographed image in the case where the image movement quantity calculated by the movement quantity calculation means has changed from being equal to or greater than a predetermined value to being less than the predetermined value, and
   a display control means,
   wherein the storage control means stores the time-lapse photographed image in the storage means in the case where the image movement quantity has changed from being equal to or greater than a predetermined value to being less than the predetermined value and the image movement quantity has been kept less than the predetermined value for at least a predetermined time, and
   the display control means displays on a display, elapsed time information indicating either the lapsed time since change in the image movement quantity to less than a predetermined value or the remaining time resulting from subtracting the lapsed time from the predetermined time while the image movement quantity is kept less than the predetermined value after the image movement quantity has changed from being equal to or greater than the predetermined value to being less than the predetermined value.

7. The photographed image storage control apparatus according to claim 1, further comprising an image recognition determination means for analyzing image data photographed by the photographing means and determining whether the image data includes a predetermined image, wherein the storage control means stores the time-lapse photographed image in the storage means in the case where the image recognition determination means determines, during a predetermined time since the image movement quantity has changed from being equal to or greater than the predetermined value to being less than the predetermined value, that the predetermined image is included.

8. A photographed image storage control apparatus comprising:
   a movement quantity calculation means for calculating an image movement quantity between a new frame and a previous frame, each including image data in frame units comprising a dynamic image photographed by a photographing means, based on difference in image data between the frames,
   a storage control means for storing in a storage means either the image data of the new frame or image data of the previous frame as a time-lapse photographed image in the case where the image movement quantity calculated by the movement quantity calculation means has changed from being equal to or greater than a predetermined value to being less than the predetermined value,
   an image recognition determination means for analyzing image data photographed by the photographing means and determining whether the image data includes a predetermined image, and
   a display control means for displaying on a display, elapsed time information indicating either the lapsed time since the image movement quantity has changed to being less than the predetermined value or the remaining time resulting from subtracting the lapsed time from the predetermined time during either a time between when the image movement quantity has changed from being equal to or greater than the predetermined value to being less than the predetermined value and when the image recognition determination means has determined that the predetermined image is included or a time between when the image movement quantity has changed from being equal to or greater than the predetermined value to being less than the predetermined value and when the predetermined time has elapsed,
   wherein the storage control means stores the time-lapse photographed image in the storage means in the case where the image recognition determination means determines, during a predetermined time since the image movement quantity has changed from being equal to or greater than the predetermined value to being less than the predetermined value, that the predetermined image is included.

9. A photographed image storage control method, comprising:
   an input step of continuously receiving a plurality of image frames in response to an input by a user which initiates a time lapse photography mode, each image frame including image data in frame units comprising a dynamic image photographed by a photographing means at a predetermined interval;
   a movement quantity calculation step of calculating by a movement quantity calculation means an image movement quantity between a new frame and a previous frame among the plurality of received image frames based on a difference in image data between the new frame and the previous frame; and
   a storage control step of storing in a storage means by a storage control means either the image data of the new frame or image data of the previous frame as a first time-lapse photographed image in a time lapse set of images when the image movement quantity calculated by the movement quantity calculation means has changed from being equal to or greater than a predetermined value to being less than the predetermined value, wherein:
   the storage control means does not store in the storage means the image data as the first time-lapse photographed image if the image movement quantity remains less than the predetermined value,
   while operating in the time lapse photography mode and without requiring any further input by the user, the movement quantity calculation means calculates a subsequent image movement quantity between each pair of image frames received subsequent to the new frame by the input means, and the storage control means stores in the storage means image data of one image frame among the pair of image frames as a next time lapse photographed image in the time lapse series of images, whenever the subsequent image movement quantity calculated by the movement quantity calculation means changes from being equal to or greater than the predetermined value to being less than the predetermined value.

10. A non-transitory computer-readable storage medium having stored thereon a photographed image storage control program executable by a computer, wherein said photographed image storage control program causes the computer to function as:

an input means for continuously receiving a plurality of image frames in response to an input by a user which initiates a time lapse photography mode, each image frame including image data in frame units comprising a dynamic image photographed by a photographing means at a predetermined interval;

a movement quantity calculation means for calculating an image movement quantity between a new frame and a previous frame among the plurality of received image frames based on a difference in image data between the new frame and the previous frame; and a storage control means for storing in a storage means either the image data of the new frame or image data of the previous frame as a first time-lapse photographed image in a time lapse set of images when the image movement quantity calculated by the movement quantity calculation means has changed from being equal to or greater than a predetermined value to being less than the predetermined value, wherein:

the storage control means does not store in the storage means the image data as the first time-lapse photographed image if the image movement quantity remains less than the predetermined value, while operating in the time lapse photography mode and without requiring any further input by the user, the movement quantity calculation means calculates a subsequent image movement quantity between each pair of image frames received subsequent to the new frame by the input means, and the storage control means stores in the storage means image data of one image frame among the pair of image frames as a next time lapse photographed image in the time lapse series of images, whenever the subsequent image movement quantity calculated by the movement quantity calculation means changes from being equal to or greater than the predetermined value to being less than the predetermined value.

* * * * *